(12) United States Patent
Lin et al.

(10) Patent No.: US 9,608,324 B2
(45) Date of Patent: Mar. 28, 2017

(54) ANTENNA APPARATUS AND METHOD FOR CONTROLLING ANTENNA ARRAY

(71) Applicant: Industrial Technology Research Institute, Hsinchu (TW)

(72) Inventors: Ming-Che Lin, Taichung (TW);
Jen-Yuan Hsu, Kinmen County (TW);
Chien-Yu Kao, New Taipei (TW);
Pang-An Ting, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 675 days.

(21) Appl. No.: 13/781,773

(22) Filed: Mar. 1, 2013

(65) Prior Publication Data

US 2014/0009338 A1 Jan. 9, 2014

Related U.S. Application Data

(60) Provisional application No. 61/668,463, filed on Jul. 6, 2012.

(51) Int. Cl.
*H01Q 3/12* (2006.01)
*H01Q 3/24* (2006.01)
*H01Q 25/00* (2006.01)
*H04W 16/28* (2009.01)

(52) U.S. Cl.
CPC ............. *H01Q 3/247* (2013.01); *H01Q 25/00* (2013.01); *H04W 16/28* (2013.01)

(58) Field of Classification Search
CPC ........ H01Q 3/247; H01Q 25/00; H04W 16/28
USPC ....................................................... 342/374
See application file for complete search history.

(56) References Cited

U.S. PATENT DOCUMENTS

| 8,219,891 | B2 * | 7/2012 | Lakkis | ................. | H04B 7/0617 |
| | | | | | 455/41.2 |
| 2010/0151865 | A1 * | 6/2010 | Camp, Jr. | ............ | H04W 72/046 |
| | | | | | 455/445 |
| 2010/0272151 | A1 * | 10/2010 | Nandagopalan | ......... | H01Q 3/30 |
| | | | | | 375/132 |

FOREIGN PATENT DOCUMENTS

| CN | 201282561 | 7/2009 |
| CN | 101834643 | 9/2010 |
| CN | 101884174 | 11/2010 |
| CN | 201233956 | 5/2012 |
| TW | 200511749 | 3/2005 |
| TW | 200729774 | 8/2007 |
| WO | 2011055536 | 5/2011 |

OTHER PUBLICATIONS

"Office Action of China Counterpart Application", issued on Jan. 5, 2016, p. 1-p. 9.

* cited by examiner

*Primary Examiner* — Frank J McGue
(74) *Attorney, Agent, or Firm* — Jianq Chyun IP Office (57) ABSTRACT

An antenna apparatus and a method for controlling an antenna array are provided. The method includes the following steps. A plurality of selectable antenna configurations is provided for a directional service. One of the antenna configurations is selected for an antenna element of the antenna array according to a service criterion. The antenna apparatus includes an antenna array, a controller, and a switching unit. The antenna array includes a plurality of antenna elements. The controller is adapted to generate a control signal based on selecting one of a plurality of antenna configurations according to a service criterion for an antenna element to provide a directional service. The switching unit is adapted to configure each of the antenna elements according to the control signal.

16 Claims, 10 Drawing Sheets

ANTENNA APPARATUS AND METHOD FOR CONTROLLING ANTENNA ARRAY

CROSS-REFERENCE TO RELATED APPLICATION

This application claims the priority benefit of U.S. provisional application Ser. No. 61/668,463, filed on Jul. 6, 2012. The entirety of the above-mentioned patent application is hereby incorporated by reference herein and made a part of this specification.

BACKGROUND

Technical Field

The disclosure relates to an antenna apparatus and a method for controlling an antenna array.

Related Art

Typically, omni-directional antennas are installed in the base station as the transmit antennas. However, interference between different user equipments (UE) reduces the overall cell throughput and needs to be mitigated. The development of smart antenna can effectively reduce the effect of interference based on the control mechanism of the antenna array for a specific UE. Meanwhile, the smart antenna can also improve the transmission quality and increase the transmit data rate of the UE. A typical smart antenna includes a plurality of antenna elements, which may be omni-directional or directional antennas. The radiation pattern of the directional antenna is also a consideration to properly control the coverage and gain for a specific transmission. Therefore, antenna configuration selection for an optimized control mechanism of an antenna array is a key research topic.

SUMMARY

The disclosure provides an antenna apparatus and a method for controlling an antenna array of a communication device. The method includes the following steps. A plurality of selectable antenna configurations is provided for a directional service. One of the antenna configurations is selected for an antenna element of the antenna array according to a service criterion.

The antenna apparatus includes an antenna array, a controller, and a switching unit. The antenna array includes a plurality of antenna elements. The controller is adapted to generate a control signal based on selecting one of a plurality of antenna configurations according to a service criterion for an antenna element to provide a directional service. The switching unit is adapted to configure each of the antenna elements according to the control signal.

In summary, an antenna apparatus and a method for controlling an antenna array of a communication device are provided according to embodiments of the disclosure. The antenna apparatus and the antenna control method operate independent of receiver design by analyzing feedback measurements. Different service criterions are considered in the antenna apparatus and the antenna control method to establish databases of the serviced UEs or locations. Accordingly, the overall performance in the cell is improved.

Several exemplary embodiments accompanied with figures are described below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
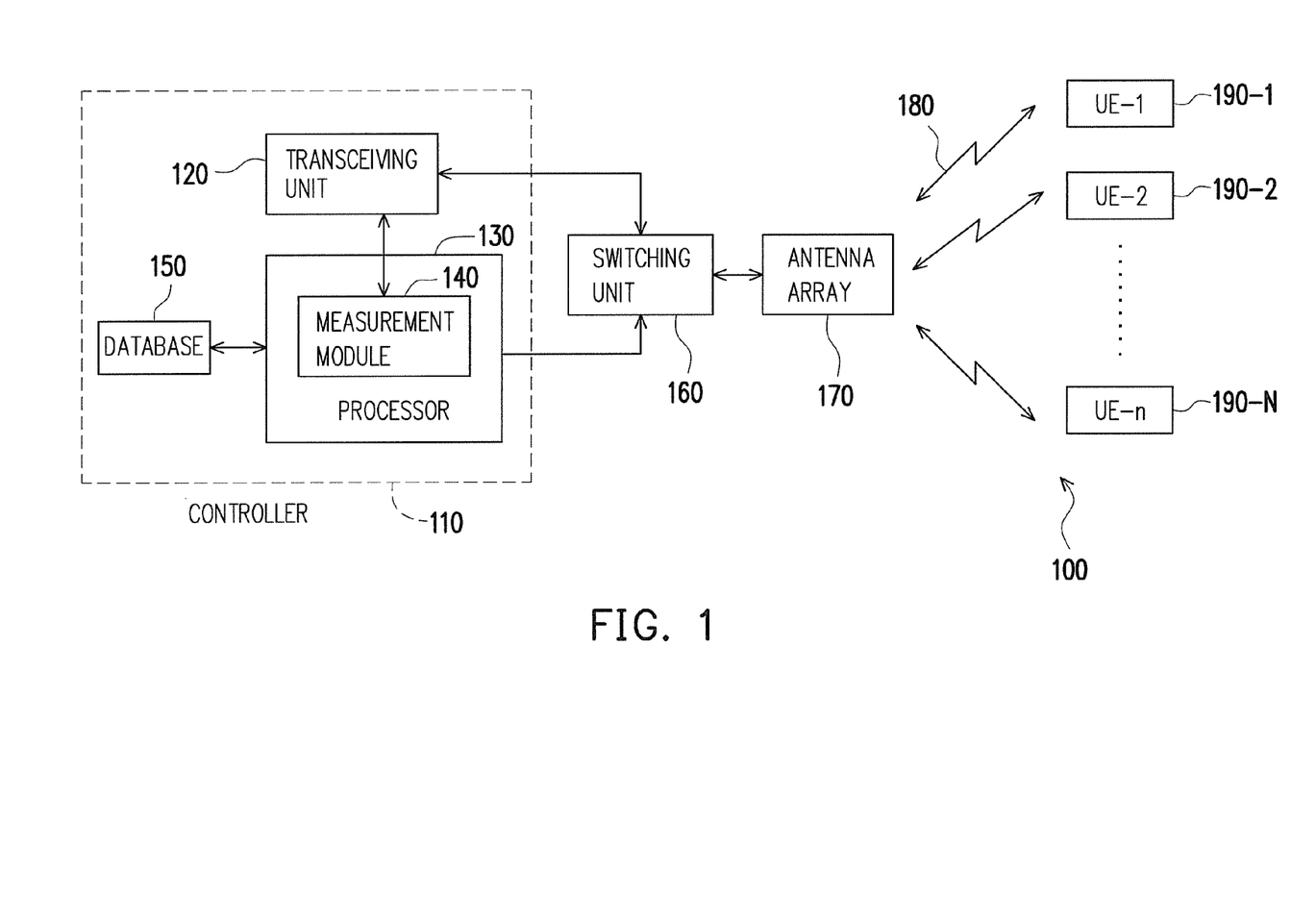
FIG. 1 is a functional block diagram of an antenna apparatus according to an exemplary embodiment of the disclosure.

FIG. 1 is a functional block diagram of an antenna apparatus according to an exemplary embodiment of the disclosure. With reference to FIG. 1, an antenna apparatus 100 includes a controller 110, a switching unit 160, and an antenna array 170. The antenna array 170 includes a plurality of antenna elements. The controller 110 is adapted to generate a control signal based on selecting one of a plurality of antenna configurations according to a service criterion for an antenna element to provide a directional service. The switching unit 160 is adapted to configure each of the antenna elements according to the control signal. In some embodiments, the controller 110 includes a transceiving unit 120 and a processor 130.

The transceiving unit 120 may be configured to generate and receive wireless signals (e.g., radio frequency or RF) in a communication system having a plurality of user equipments (UEs) 190-1 to 190-N and a communication device (e.g. a base station) having the antenna apparatus 100. The transceiving unit 120 may also receive data from a router (not drawn). Moreover, the transceiving unit 120 may perform analog-to-digital signal conversion (ADC), digital-toanalog signal conversion (DAC), modulation, demodulation, signal amplification, low-pass filtering, and bandpass filtering. Although the antenna apparatus 100 will be described in the context of a base station, the antenna apparatus 100 may also be installed in a digital television (TV), a digital set-top box, a personal computer (PC), a notebook computer, a tablet computer, a netbook, a mobile phone, a smart mobile phone, a water meter, a gas meter, a watt-hour meter, an alarm, a sensor, or a monitor.

In some embodiments, signals received by the antenna array 170 over a wireless link 180 may be collected into the RF and baseband modules of the antenna apparatus 100, which may include media access control (MAC) and physical (PHY) layers (not drawn) to demodulate the info nation contained in the received signals. Feedback parameters such as ACK/NACK and received signal strength indication (RSSI) may be inputted into a measurement module 140 of the processor 130. Furthermore, block error rate (BLER) and throughput (i.e. rate of successful delivery) may also serve as inputs of the measurement module 140, although the disclosure is not limited thereto. The processor 130 establishes a database 150 of antenna configurations based on the different service criterions and feedback parameters further described later in the disclosure. The database 150 may be stored in a memory (not drawn) coupled to the processor 130 that is used to store a ranking of the antenna configurations. For each transmission, the processor 130 selects the optimal antenna configuration as the transmit antenna configuration of the servicing cell with the antenna apparatus 100.

According to an exemplary embodiment, the controller 110 generates a control signal based on selecting one of the antenna configurations for an antenna element of the antenna array 170 to provide a directional service according to a UE priority service criterion. Accordingly, the processor 130 may execute an antenna control algorithm which includes prioritizing the UEs 190-1 to 190-N, probing a specific priority UE (may be the higher or the lower priority) with the antenna configurations, ranking the antenna configurations for the specific priority UE according to a feedback parameter (e.g. RSSI, BLER, and throughput) provided by the measurement module 140, selecting one of the antenna configurations to provide the directional service to the specific priority UE according to the feedback parameter, and updating the ranking of the antenna configurations for the specific priority UE and re-selecting the antenna configuration according to an updated feedback parameter. It should be noted that the prioritization of the UEs 190-1 to 190-N may be manually determined in the database 150 in advance, and the prioritization may be based on an identification of the UE (e.g. MAC address) and a corresponding importance. Moreover, the processor 130 may rank the antenna configurations for the specific priority UE by averaging the feedback parameter for each antenna configuration and then listing the ranking, although the disclosure is not limited to this type of ranking. Additionally, the antenna control algorithm may further include a layer 2 (L2) radio resource scheduling to adjust the antenna configurations depending on whether the specific priority UE is scheduled in the current transmission or not.

Figure 2A:
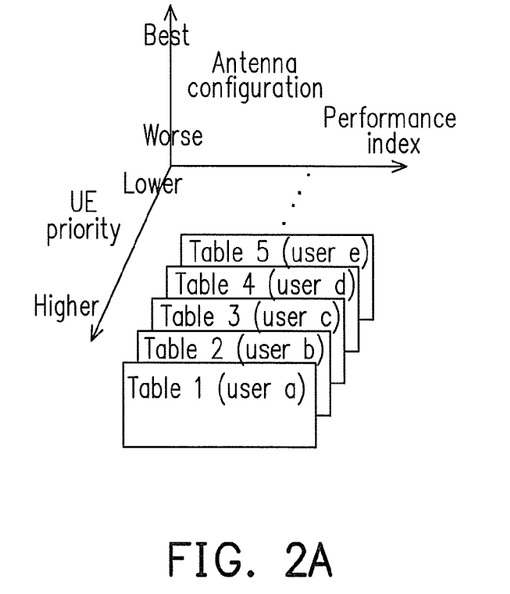
FIG. 2A is a schematic diagram of the database depicted in FIG. 1 according to an exemplary embodiment of the disclosure.

FIG. 2A is a schematic diagram of the database 150 depicted in FIG. 1 according to an exemplary embodiment of the disclosure. With reference to FIG. 2A, in the UE priority database shown, the horizontal axis ranks the performance index, the vertical axis ranks the antenna configuration, and the out of page axis ranks UE priority. Accordingly, a table is created in the database 150 for each UE, and the controller 110 can select the antenna configuration according to the UE priority service criterion based on the database 150.

Figure 2B:
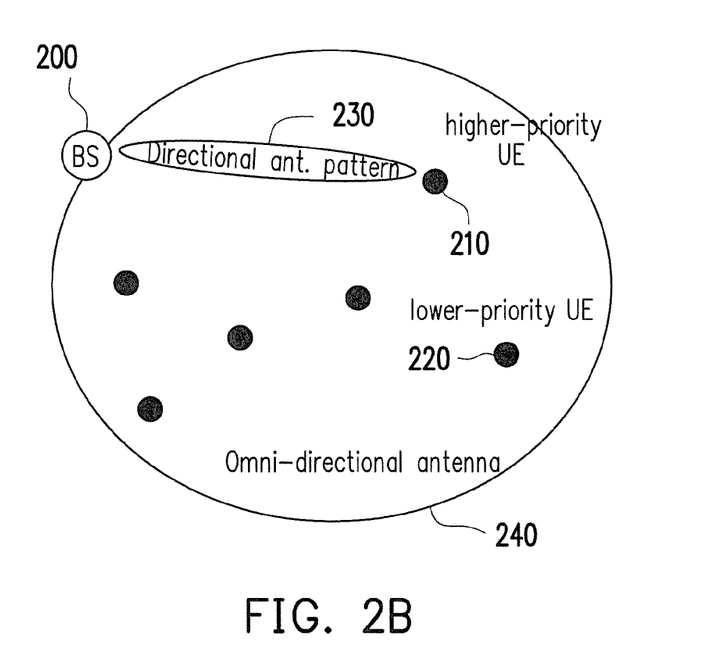
FIG. 2B is a schematic view of a base station having the antenna apparatus depicted in FIG. 1 according to an exemplary embodiment of the disclosure.

FIG. 2B is a schematic view of a base station having the antenna apparatus depicted in FIG. 1 according to an exemplary embodiment of the disclosure. With reference to FIGS. 1 and 2B, a directional antenna pattern 230 selected by the controller 110 is provided by a base station 200 to the specific priority (the higher priority) UE 210. Moreover, according to the control signal generated by the controller 110, the switching unit 160 assigns an omni-directional antenna configuration 240 for the other antenna elements of the antenna array 170 to provide an omni-directional service to the lower-priority UEs 220, and the antenna elements having the omni-directional antenna configuration 240 cooperate with the antenna element having the selected antenna configuration 230. The power distribution of the directional and omni-directional antennas may be averagely shared between the two types of antenna configurations, for example.

Figure 3:
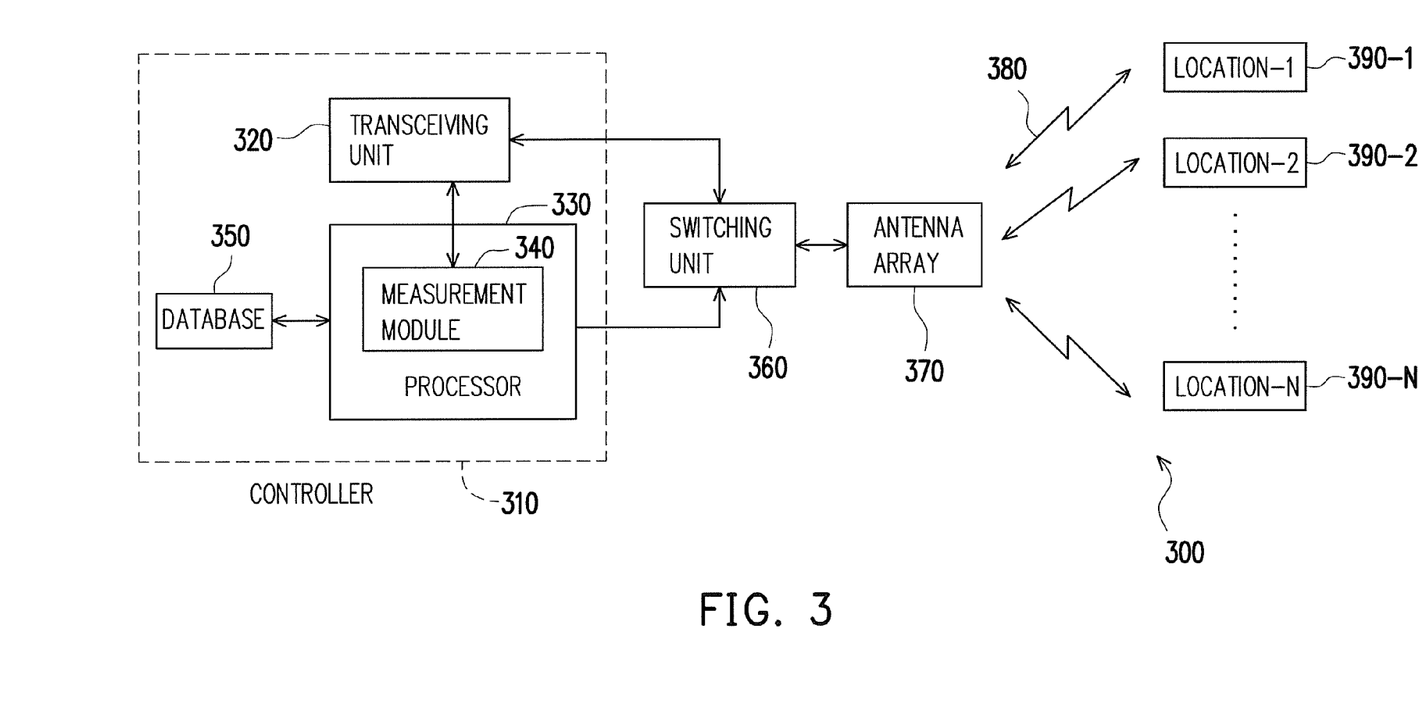
FIG. 3 is a functional block diagram of an antenna apparatus according to an exemplary embodiment of the disclosure.

FIG. 3 is a functional block diagram of an antenna apparatus according to an exemplary embodiment of the disclosure. A difference between an antenna apparatus 300 shown in FIG. 3 and the antenna apparatus 100 depicted in FIG. 1 is in the service criterion for the antenna configuration selection. According to an exemplary embodiment, a controller 310 generates a control signal based on selecting one of the antenna configurations for an antenna element of an antenna array 370 to provide a directional service according to a location service criterion. Accordingly, a processor 330 may execute an antenna control algorithm which includes probing a plurality of UEs with each of the antenna configurations, averaging a feedback parameter (e.g. RSSI, BLER, and throughout) of each of the antenna configurations, ranking and selecting one of the antenna configuration according to the averaged feedback parameter, predicting a service location 390-1 to 390-N of the selected antenna configuration, using the selected antenna configuration to provide the directional service for the predicted service location, and updating the ranking of the antenna configurations and re-selecting the antenna configuration according to an updated averaged feedback parameter. The service location of the cell may also be adjusted if required by the updated averaged feedback parameter. The antenna control algorithm performed by the processor 330 may predict the best service location as defined by a high RSSI, a low BLER, or a high cell throughput. In other words, the antenna control algorithm may predict the service location that the UEs appear frequently. However, the disclosure is not limited thereto, and the antenna control algorithm performed by the processor 330 may also predict the service location as defined by a low RSSI, a high BLER, or a low cell throughput.

Figure 4A:
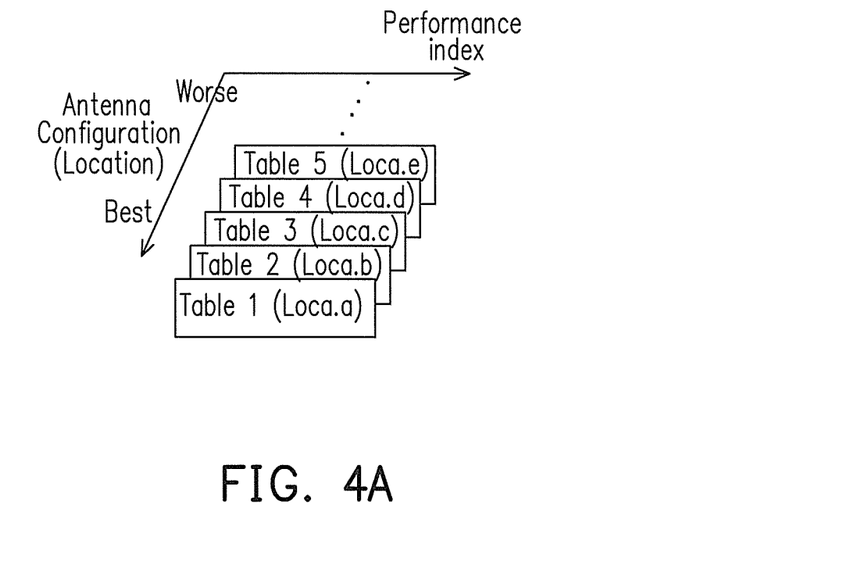
FIG. 4A is a schematic diagram of the database depicted in FIG. 3 according to an exemplary embodiment of the disclosure.

FIG. 4A is a schematic diagram of the database 350 depicted in FIG. 3 according to an exemplary embodiment of the disclosure. With reference to FIG. 4A, in the location database shown, the horizontal axis ranks the performance index, and the out of page axis ranks the antenna configuration. Accordingly, a table is created in the database 350 for each location, and the controller 310 can select the antenna configuration according to the location service criterion based on the database 350.

Figure 4B:
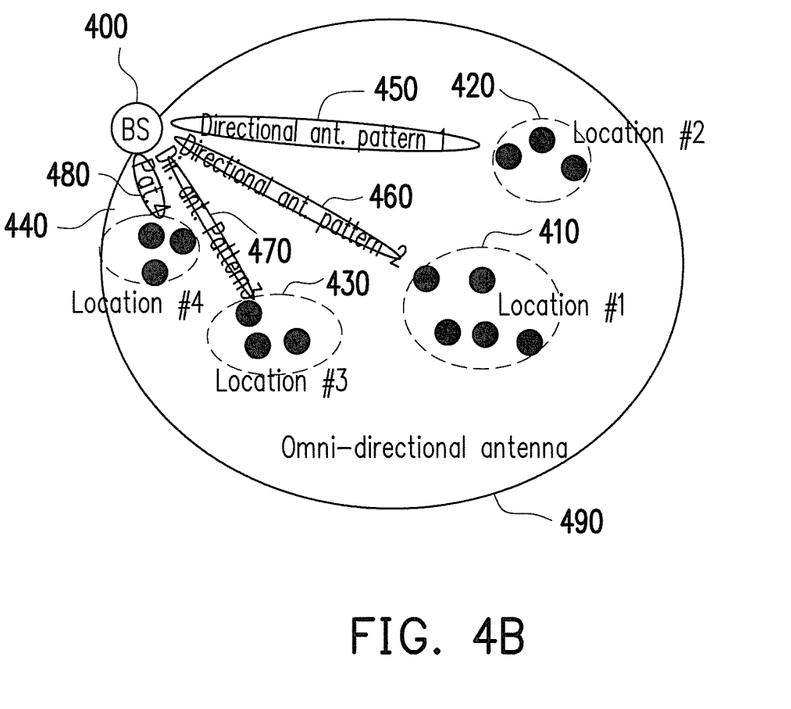
FIG. 4B is a schematic view of a base station having the antenna apparatus depicted in FIG. 3 according to an exemplary embodiment of the disclosure.

FIG. 4B is a schematic view of a base station having the antenna apparatus depicted in FIG. 3 according to an exemplary embodiment of the disclosure. With reference to FIGS. 3 and 4B, one of the directional antenna patterns 450-480 selected by the controller 310 is provided by a base station

400 to one of the predicted service locations 410-440. Moreover, according to the control signal generated by the controller 310, the switching unit 360 assigns an omni-directional antenna configuration 490 for the other antenna elements of the antenna array 370 to provide an omni-directional service to the locations which are not selected. In the example shown in FIG. 4B, assuming the directional antenna pattern 2 (460) is selected, then location #1 (410) can be the service location predicted by the controller 310, and the other locations 420-440 are provided with the omni-directional antenna 490. The antenna elements having the omni-directional antenna configuration 490 cooperate with the antenna element having the selected antenna configuration 460. The power distribution of the directional and omni-directional antennas may be averagely shared between the two types of antenna configurations, for example.

Figure 5:
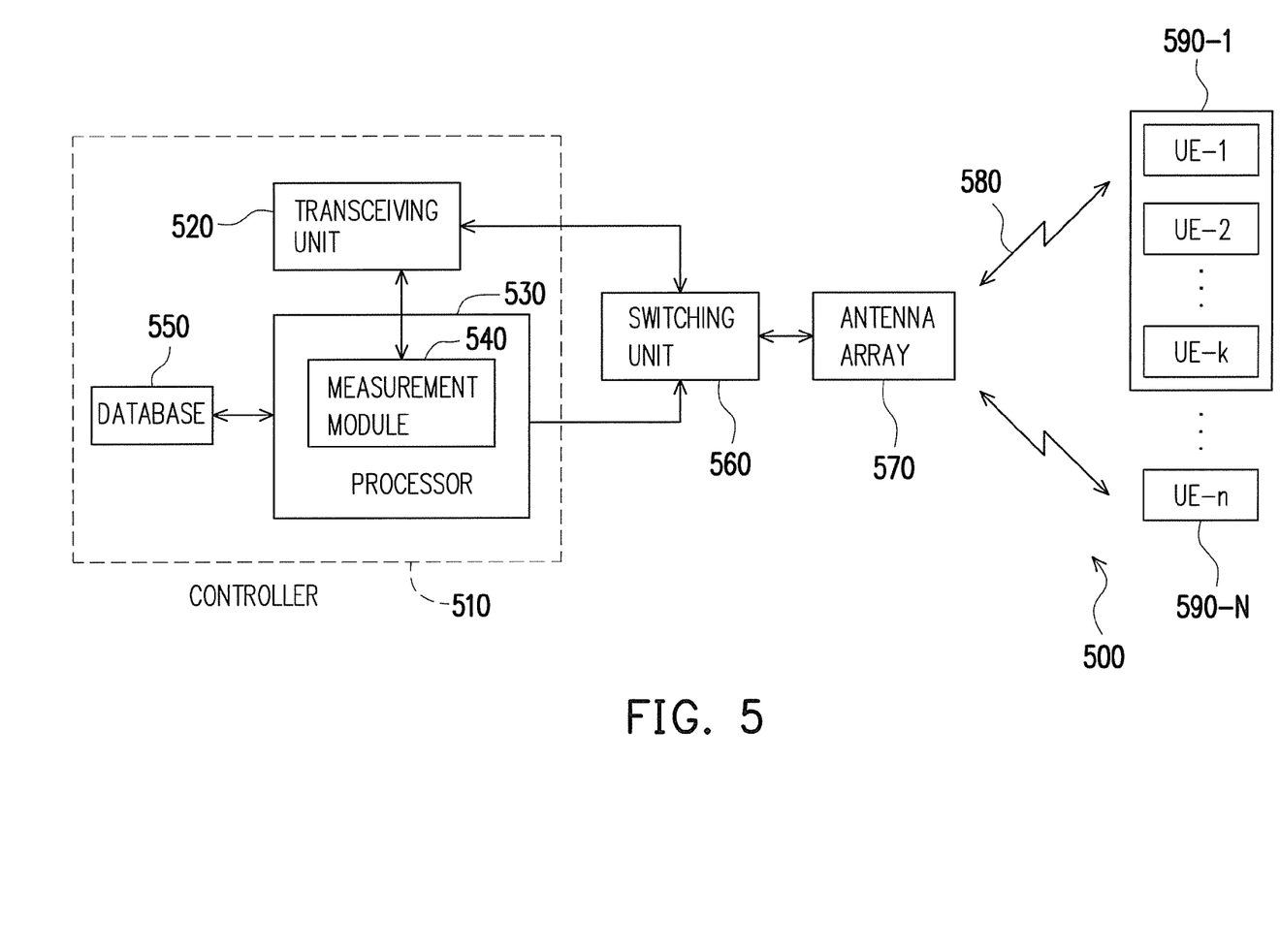
FIG. 5 is a functional block diagram of an antenna apparatus according to an exemplary embodiment of the disclosure.

FIG. 5 is a functional block diagram of an antenna apparatus according to an exemplary embodiment of the disclosure. A difference between an antenna apparatus 500 shown in FIG. 5 and the antenna apparatus 100 depicted in FIG. 1 is in the service criterion for the antenna configuration selection. According to an exemplary embodiment, a controller 510 generates a control signal based on selecting one of the antenna configurations for an antenna element of an antenna array 570 to provide a directional service according to a UE grouping service criterion. Accordingly, a processor 530 may execute an antenna control algorithm which includes probing a plurality of users with each of the antenna configurations, ranking a feedback parameter (e.g. RSSI, BLER, and throughput) of each of the antenna configurations for each of the UE-1 to UE-n, grouping the UEs as a user group (e.g. user groups 590-1 to 590-N) having the same antenna configuration and similar performance statistics according to the feedback parameters, scheduling the user group (e.g. user group 590-1) in a same transmitting time slot and using the corresponding antenna configuration of the user group to provide the directional service, and updating the ranking of the antenna configurations for each of the UE-1 to UE-n and re-grouping the UEs. It should be noted that the re-grouping of the UEs may occur in a periodic manner or according to an updated feedback parameter for the user group. Moreover, depending on the flexibility of the L2 design, the selected antenna configuration can further include L2 radio resource scheduling to adjust the scheduling such as the physical layer parameters of the user groups.

Figure 6A:
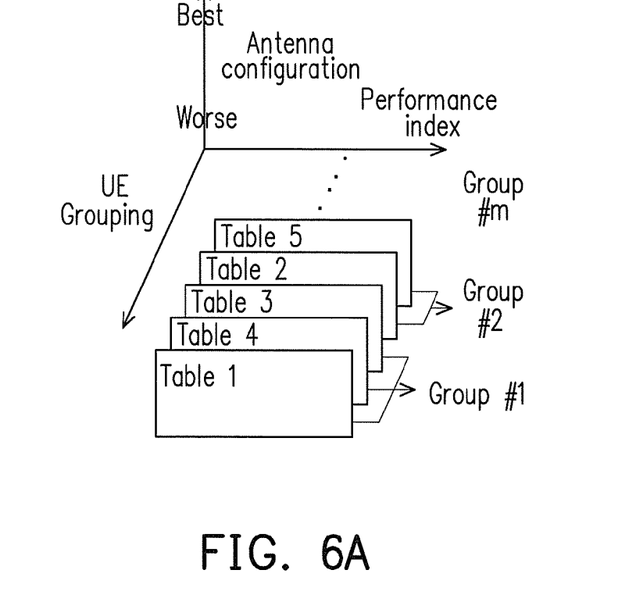
FIG. 6A is a schematic diagram of the database depicted in FIG. 5 according to an exemplary embodiment of the disclosure.

FIG. 6A is a schematic diagram of the database 550 depicted in FIG. 5 according to an exemplary embodiment of the disclosure. With reference to FIG. 6A, in the UE grouping database shown, the horizontal axis ranks the performance index, the vertical axis ranks the antenna configurations, and the out of page axis depicts the UE groups. Accordingly, a table is created in the database 550 for each user group, and the controller 510 can select the antenna configuration according to the UE grouping service criterion based on the database 550.

Figure 6B:
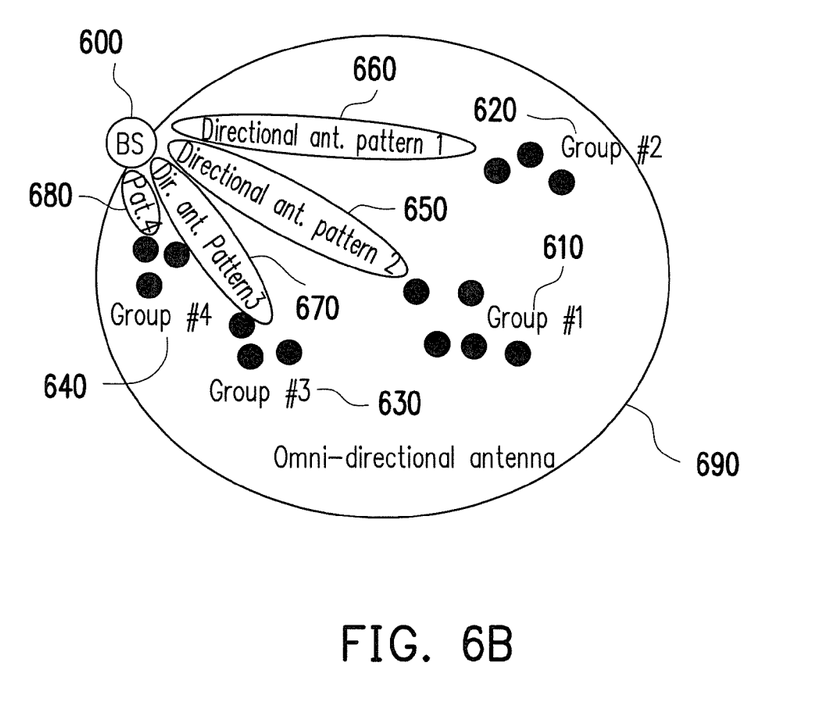
FIG. 6B is a schematic view of a base station having the antenna apparatus depicted in FIG. 5 according to an exemplary embodiment of the disclosure.

FIG. 6B is a schematic view of a base station having the antenna apparatus depicted in FIG. 5 according to an exemplary embodiment of the disclosure. With reference to FIGS. 5 and 6B, each of the user groups 610-640 is scheduled in a same transmitting time slot using the corresponding directional antenna configurations 650-690 provided by a base station 600. Moreover, according to the control signal generated by the controller 510, the switching unit 560 assigns an omni-directional antenna configuration 690 for the other antenna elements of the antenna array 570 to provide an omni-directional service to the UEs which are not belong to current scheduled user group. In the example shown in FIG. 6B, each of the user groups 610-640 is respectively scheduled in the same transmitting time slot, and the UEs which are not belong to scheduled user group during the time slot are provided with omni-directional service from the base station 600. The antenna elements having the omni-directional antenna configuration 690 cooperate with the antenna element having the selected antenna configuration during the transmitting time slot. The power distribution of the directional and omni-directional antennas may be averagely shared between the two types of antenna configurations, for example.

It should be appreciated that the antenna control algorithms executed by the processors 130, 330, and 530 depicted in FIGS. 1, 3, and 5 may also be stored in a non-transitory computer-readable storage medium. Moreover, according to the description of the antenna apparatus 100, 300, and 500, methods for controlling an antenna array of a communication device can be obtained.

Figure 7:
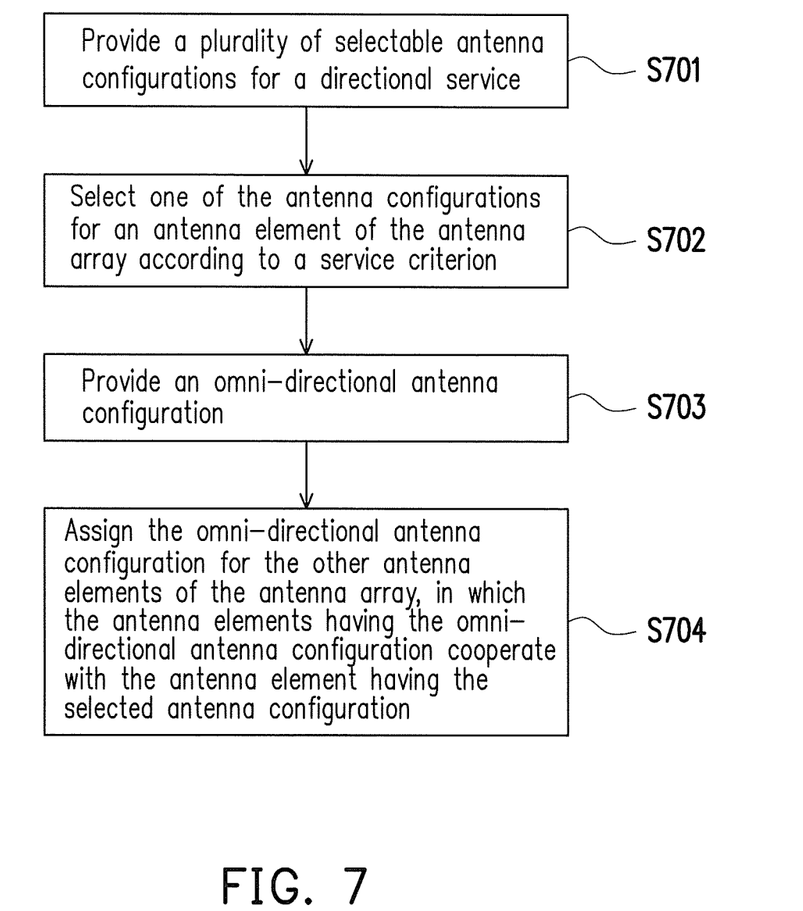
FIG. 7 is a flow diagram of a method for controlling an antenna array of a communication device according to an exemplary embodiment of the disclosure.

FIG. 7 is a flow diagram of a method for controlling an antenna array of a communication device according to an exemplary embodiment of the disclosure. In S701, a plurality of selectable antenna configurations is provided for a directional service. In Step S702, one of the antenna configurations is selected for an antenna element of the antenna array according to a service criterion. According to some embodiments, in Step S703, an omni-directional antenna configuration is provided. In Step S704, the omni-directional antenna configuration is assigned for the other antenna elements of the antenna array, in which the antenna elements having the omni-directional antenna configuration cooperate with the antenna element having the selected antenna configuration.

Figure 8:
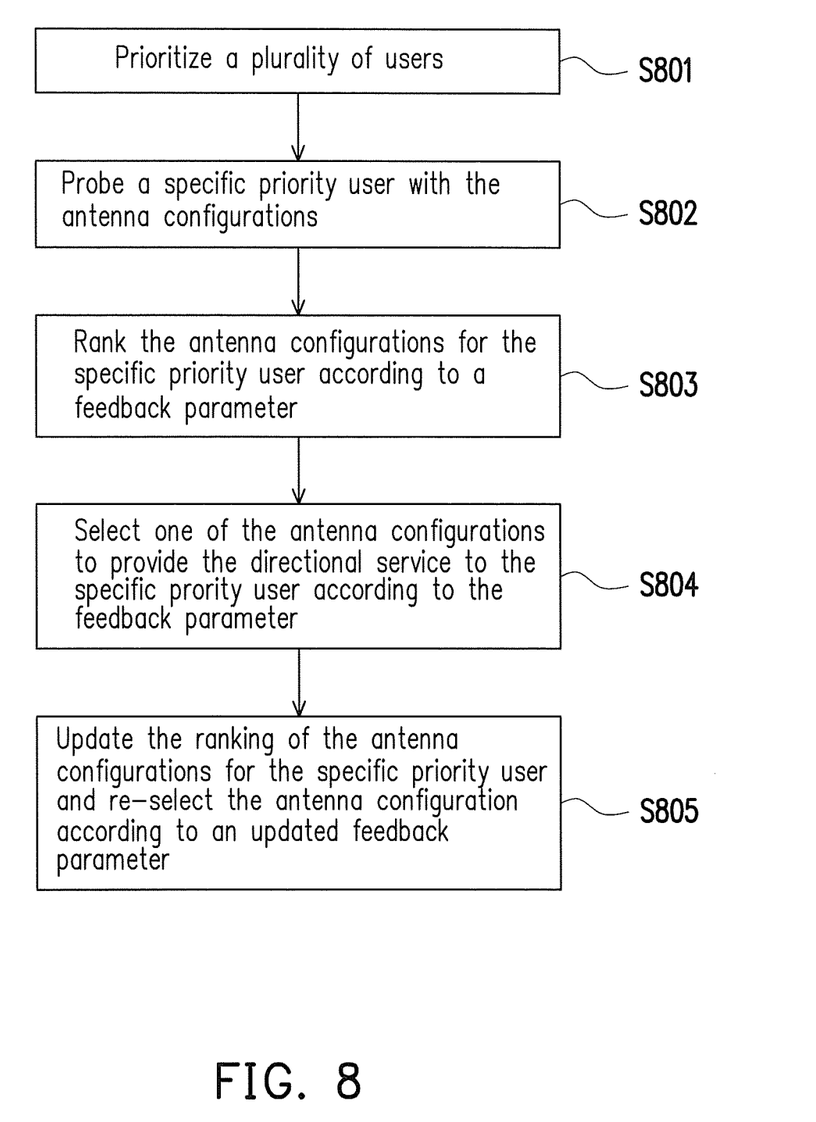
FIG. 8 is a flow diagram of the selection step depicted in FIG. 7 according to an exemplary embodiment of the disclosure.

FIG. 8 is a flow diagram of the selection step depicted in FIG. 7 according to an exemplary embodiment of the disclosure. As shown in FIG. 8, Step S702 of FIG. 7 may further include the following steps. In Step S801, a plurality of users is prioritized. In Step S802, a specific priority user is probed with the antenna configurations. In Step S803, the antenna configurations are ranked for the specific priority user according to a feedback parameter. In Step S804, one of the antenna configurations is selected to provide the directional service to the specific priority user according to the feedback parameter. In Step S805, the ranking of the antenna configurations is updated for the specific priority user and the antenna configuration is re-selected according to an updated feedback parameter.

Figure 9:
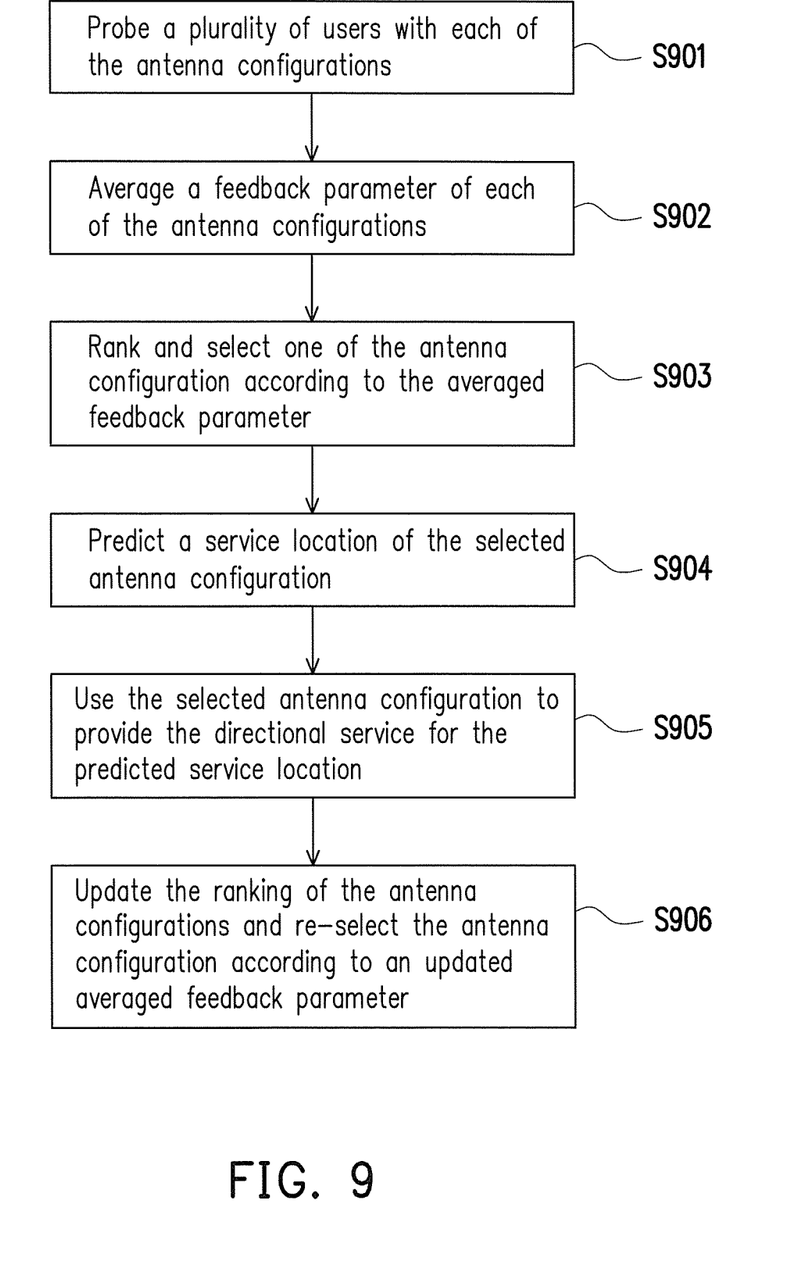
FIG. 9 is a flow diagram of the selection step depicted in FIG. 7 according to an exemplary embodiment of the disclosure.

FIG. 9 is a flow diagram of the selection step depicted in FIG. 7 according to an exemplary embodiment of the disclosure. As shown in FIG. 9, Step S702 of FIG. 7 may further include the following steps. In Step S901, a plurality of users is probed with each of the antenna configurations. In Step S902, a feedback parameter of each of the antenna configurations is averaged. In Step S903, the antenna configurations are ranked according to the averaged feedback parameter and one of the antenna configurations is selected. In Step S904, a service location of the selected antenna configuration is predicted. In Step S905, the selected antenna configuration is used to provide the directional service for the predicted service location. In Step S906, the ranking of the antenna configurations is updated and the antenna configuration is re-selected according to an updated averaged feedback parameter.

Figure 10:
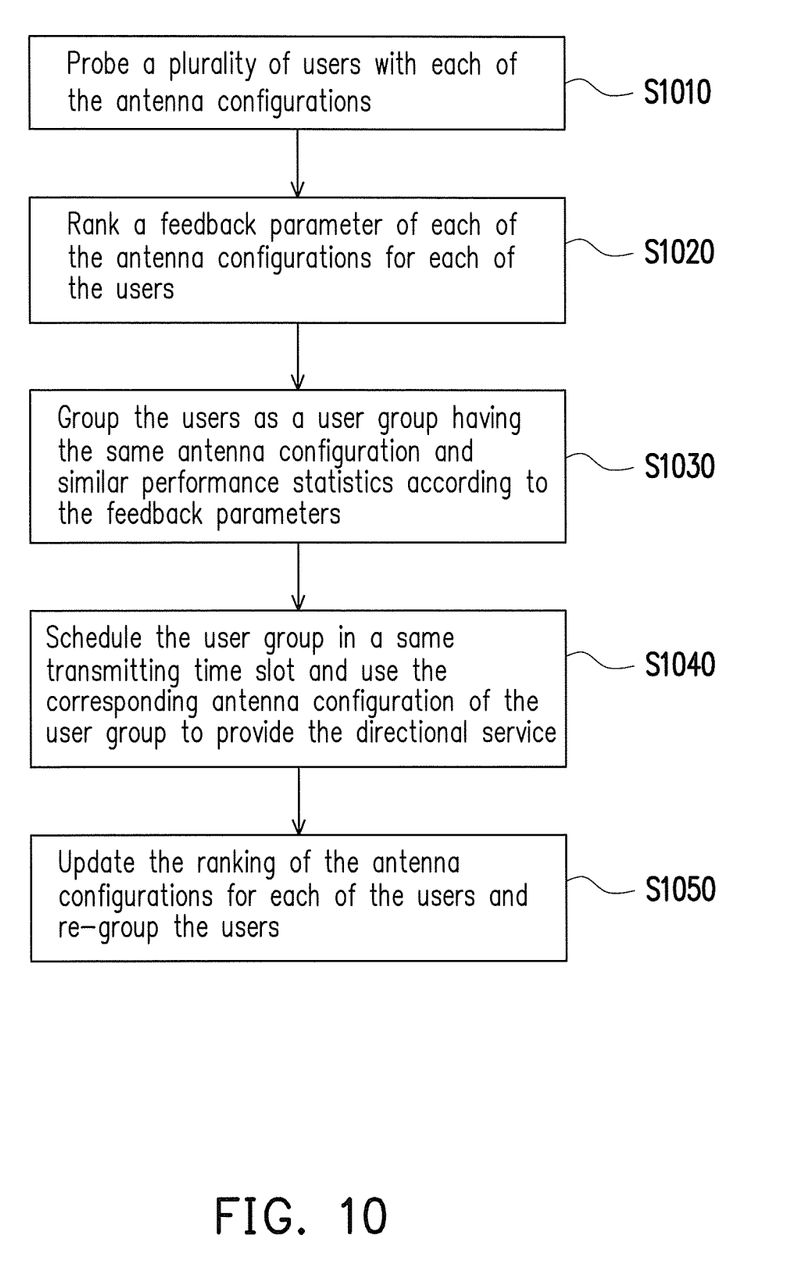
FIG. 10 is a flow diagram of the selection step depicted in FIG. 7 according to an exemplary embodiment of the disclosure.

FIG. 10 is a flow diagram of the selection step depicted in FIG. 7 according to an exemplary embodiment of the disclosure. As shown in FIG. 9, Step S702 of FIG. 7 may further include the following steps. In Step S1010, a plurality of users is probed with each of the antenna configurations. In Step S1020, a feedback parameter of each of the antenna configurations is ranked for each of the users. In Step S1030, the users are grouped as a user group having the same antenna configuration and similar performance statistics according to the feedback parameters. In Step S1040, the user group is scheduled in a same transmitting time slot and the corresponding antenna configuration of the user group is used to provide the directional service. In Step S1050, the ranking of the antenna configurations is updated for each of the users and the users are re-grouped. It should be noted that further details of the methods described in FIGS. 7 to 10 may be referenced to the earlier description of the antenna apparatus 100, 300, and 500.

In view of the foregoing, an antenna apparatus and a method for controlling an antenna array of a communication device are provided according to embodiments of the disclosure. The antenna apparatus and the antenna control method operate independent of receiver design by analyzing feedback measurements. Different service criterions are considered in the antenna apparatus and the antenna control method to establish databases of the serviced UEs or locations. Accordingly, the overall performance in the cell is improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for controlling an antenna array of a communication device, the method comprising:
providing a plurality of selectable antenna configurations for a directional service; and
selecting one of the antenna configurations for an antenna element of the antenna array according to a service criterion, wherein the service criterion comprises probing a plurality of users with each of the antenna configurations, ranking the antenna configurations according to one of the users or at least one part of the users, and selecting the antenna configurations according to the ranking of the antenna configurations, wherein the one of the users is determined in advance and has the priority to select the antenna configurations, wherein the at least one part of the users are located in a same service location or the at least one part of the users have the same antenna configuration and similar performance statistics, wherein ranking the antenna configurations further comprises ranking the antenna configurations for the one of the users or at least one part of the users by averaging a feedback parameter for each of the antenna configurations and then listing the ranking from the best to the worst based on the averaged feedback parameter, wherein selecting the antenna configurations according to the ranking of the antenna configurations further comprises selecting the one of the antenna configurations among the ranking for the one of the users or selecting the one of the antenna configurations corresponding to the at least one part of the users among the ranking to provide the directional service.

2. The method of claim 1, further comprising:
providing an omni-directional antenna configuration; and
assigning the omni-directional antenna configuration for the other antenna elements of the antenna array,
wherein the antenna elements having the omni-directional antenna configuration cooperate with the antenna element having the selected antenna configuration.

3. The method of claim 2, wherein the step of selecting the one of the antenna configurations for the antenna element of the antenna array according to the service criterion comprises:
prioritizing a plurality of users;
probing a specific priority user with the antenna configurations;
ranking the antenna configurations for the specific priority user according to a feedback parameter;
selecting one of the antenna configurations to provide the directional service to the specific priority user according to the feedback parameter; and
updating the ranking of the antenna configurations for the specific priority user and re-selecting the antenna configuration according to an updated feedback parameter.

4. The method of claim 2, wherein the step of selecting the one of the antenna configurations for the antenna element of the antenna array according to the service criterion comprises:
probing a plurality of users with each of the antenna configurations;
averaging a feedback parameter of each of the antenna configurations;
ranking and selecting one of the antenna configuration according to the averaged feedback parameter;
predicting a service location of the selected antenna configuration;
using the selected antenna configuration to provide the directional service for the predicted service location; and
updating the ranking of the antenna configurations and re-selecting the antenna configuration according to an updated averaged feedback parameter.

5. The method of claim 2, wherein the step of selecting the one of the antenna configurations for the antenna element of the antenna array according to the service criterion comprises:
probing a plurality of users with each of the antenna configurations;
ranking the feedback parameter of each of the antenna configurations for each of the users;
grouping the users as a user group having the same antenna configuration and similar performance statistics according to the feedback parameters;
scheduling the user group in a same transmitting time slot and using the corresponding antenna configuration of the user group to provide the directional service; and
updating the ranking of the antenna configurations for each of the users and re-grouping the users.

6. The method of claim 1, wherein the step of selecting the one of the antenna configurations for the antenna element of the antenna array according to the service criterion comprises:
prioritizing a plurality of users;
probing a specific priority user with the antenna configurations;
ranking the antenna configurations for the specific priority user according to a feedback parameter;
selecting one of the antenna configurations to provide the directional service to the specific priority user according to the feedback parameter; and
updating the ranking of the antenna configurations for the specific priority user and re-selecting the antenna configuration according to an updated feedback parameter.

7. The method of claim 1, wherein the step of selecting the one of the antenna configurations for the antenna element of the antenna array according to the service criterion comprises:
probing a plurality of users with each of the antenna configurations;
averaging a feedback parameter of each of the antenna configurations;
ranking and selecting one of the antenna configuration according to the averaged feedback parameter;
predicting a service location of the selected antenna configuration;
using the selected antenna configuration to provide the directional service for the predicted service location; and
updating the ranking of the antenna configurations and re-selecting the antenna configuration according to an updated averaged feedback parameter.

8. The method of claim 1, wherein the step of selecting the one of the antenna configurations for the antenna element of the antenna array according to the service criterion comprises:
probing a plurality of users with each of the antenna configurations;
ranking a feedback parameter of each of the antenna configurations for each of the users;
grouping the users as a user group having the same antenna configuration and similar performance statistics according to the feedback parameters;
scheduling the user group in a same transmitting time slot and using the corresponding antenna configuration of the user group to provide the directional service; and
updating the ranking of the antenna configurations for each of the users and re-grouping the users.

9. An antenna apparatus of a communication device, comprising:
an antenna array comprising a plurality of antenna elements;
a controller adapted to generate a control signal based on selecting one of a plurality of antenna configurations according to a service criterion for an antenna element to provide a directional service, wherein the service criterion comprises probing a plurality of users with each of the antenna configurations, ranking the antenna configurations according to one of the users or at least one part of the users, and selecting the antenna configurations according to the ranking of the antenna configurations, wherein the one of the users is determined in advance and has the priority to select the antenna configurations, wherein the at least one part of the users are located in a same service location or the at least one part of the users have the same antenna configuration and similar performance statistics, wherein ranking the antenna configurations further comprises ranking the antenna configurations for the one of the users or at least one part of the users by averaging a feedback parameter for each of the antenna configurations and then listing the ranking from the best to the worst based on the averaged feedback parameter, wherein selecting the antenna configurations according to the ranking of the antenna configurations further comprises selecting the one of the antenna configurations among the ranking for the one of the users or selecting the one of the antenna configurations corresponding to the at least one part of the users among the ranking to provide the directional service; and
a switching unit adapted to configure each of the antenna elements according to the control signal.

10. The antenna apparatus of claim 9, wherein the switching unit assigns an omni-directional antenna configuration for the other antenna elements of the antenna array, and the antenna elements having the omni-directional antenna configuration cooperate with the antenna element having the selected antenna configuration.

11. The antenna apparatus of claim 10, wherein the controller selects the one of the antenna configurations according to the service criterion by prioritizing a plurality of users, probing a specific priority user with the antenna configurations, ranking the antenna configurations for the specific priority user according to a feedback parameter, selecting one of the antenna configurations to provide the directional service to the specific priority user according to the feedback parameter, and updating the ranking of the antenna configurations for the specific priority user and re-selecting the antenna configuration according to an updated feedback parameter.

12. The antenna apparatus of claim 10, wherein the controller selects the one of the antenna configurations according to the service criterion by probing a plurality of users with each of the antenna configurations, averaging a feedback parameter of each of the antenna configurations, ranking and selecting one of the antenna configuration according to the averaged feedback parameter, predicting a service location of the selected antenna configuration, using the selected antenna configuration to provide the directional service for the predicted service location, and updating the ranking of the antenna configurations and re-selecting the antenna configuration according to an updated averaged feedback parameter.

13. The antenna apparatus of claim 10, wherein the controller selects the one of the antenna configurations according to the service criterion by probing a plurality of users with each of the antenna configurations, ranking a feedback parameter of each of the antenna configurations for each of the users, grouping the users as a user group having the same antenna configuration and similar performance statistics according to the feedback parameters, scheduling the user group in a same transmitting time slot and using the corresponding antenna configuration of the user group to provide the directional service, and updating the ranking of the antenna configurations for each of the users and re-grouping the users.

14. The antenna apparatus of claim 9, wherein the controller selects the one of the antenna configurations according to the service criterion by prioritizing a plurality of users, probing a specific priority user with the antenna configurations, ranking the antenna configurations for the specific priority user according to a feedback parameter, selecting one of the antenna configurations to provide the directional service to the specific priority user according to the feedback parameter, and updating the ranking of the antenna configurations for the specific priority user and re-selecting the antenna configuration according to an updated feedback parameter.

15. The antenna apparatus of claim 9, wherein the controller selects the one of the antenna configurations according to the service criterion by probing a plurality of users with each of the antenna configurations, averaging a feedback parameter of each of the antenna configurations, ranking and selecting one of the antenna configuration according to the averaged feedback parameter, predicting a service location of the selected antenna configuration, using the selected antenna configuration to provide the directional service for the predicted service location, and updating the ranking of the antenna configurations and re-selecting the antenna configuration according to an updated averaged feedback parameter.

16. The antenna apparatus of claim 9, wherein the controller selects the one of the antenna configurations according to the service criterion by probing a plurality of users with each of the antenna configurations, ranking a feedback parameter of each of the antenna configurations for each of the users, grouping the users as a user group having the same antenna configuration and similar performance statistics according to the feedback parameters, scheduling the user group in a same transmitting time slot and using the corresponding antenna configuration of the user group to provide the directional service, and updating the ranking of the antenna configurations for each of the users and re-grouping the users.

* * * * *